H. B. TAYLOR.
ELECTRICAL MEASURING INSTRUMENT.
APPLICATION FILED FEB. 4, 1918.

1,386,034.

Patented Aug. 2, 1921.

WITNESSES:
W. S. Reece
J. H. Procter

INVENTOR
Harold B. Taylor
BY
Wesley G. Carr
ATTORNEY

UNITED STATES PATENT OFFICE.

HAROLD B. TAYLOR, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,386,034.  Specification of Letters Patent.  Patented Aug. 2, 1921.

Application filed February 4, 1918. Serial No. 215,382.

*To all whom it may concern:*

Be it known that I, HAROLD B. TAYLOR, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to direct-current wattmeters that are used in connection with current shunts.

One object of my invention is to provide a direct-current wattmeter that may be operated in connection with a relatively low-resistance current shunt.

Another object of my invention is to provide a direct-current wattmeter, of the above-indicated character, that shall be accurate in operation and simple and inexpensive to construct.

Heretofore, in direct-current wattmeters, it has been necessary to either pass the total line current through the current coil or to connect the current coil in shunt relation to a relatively high-resistance current shunt. If the total current is passed through the current coil, the capacity of the instrument is limited by reason of the size of the conductor necessary to conduct the current and if a relatively high-resistance shunt is used, relatively large losses obtain in the circuit.

In carrying out my invention, I provide a potentiometer conductor that is connected across the circuit and means whereby the current traversing the same is adapted to be varied substantially in inverse proportion to the voltage of the circuit. Means is provided for so shifting the contact member of the potentiometer conductor that the potential at the point of contact is balanced with respect to the drop across a relatively low-resistance current shunt. With such an arrangement, the position of the contact member is, at all times, an indication of the power traversing the circuit and, consequently, only a relatively low-resistance current shunt need be used.

Figure 1:
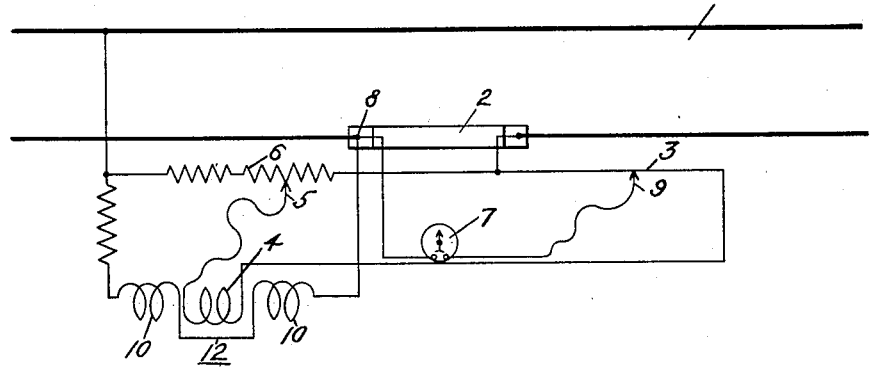
Figure 2:
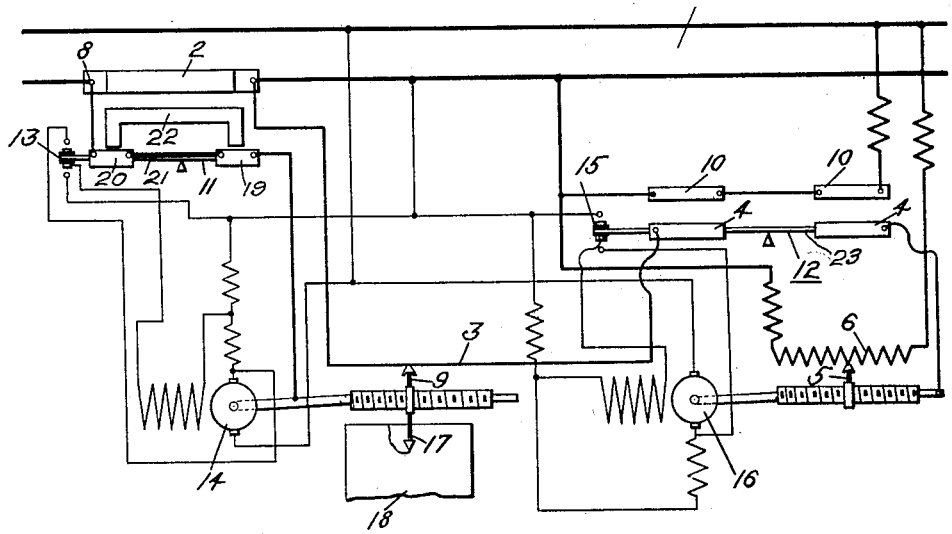

Figure 1 of the accompanying drawings is a diagrammatic view of a measuring instrument embodying my invention, and Fig. 2 is a diagrammatic view of an automatically-operated instrument similar to that shown in Fig. 1 of the drawings.

In Fig. 1 of the drawings, an electric circuit 1 is provided with a relatively low-resistance current shunt 2. A potentiometer conductor 3 is connected from one terminal of the shunt 2, through the movable coil 4 of an indicator or electro-responsive device 12, a movable contact member 5 and resistor 6, to the other conductor of the circuit 1. A galvanometer 7 is connected, from the other terminal 8 of the shunt 2, to a movable contact member 9 that is adapted to be moved along the potentiometer 3. The stationary windings or coils 10 of the indicator or electro-responsive device 12 are connected, from the terminal 8, to the other conductor of the circuit 1.

If the voltage across the circuit 1 is maintained constant and the movable contact member 9 is adjusted, with respect to the potentiometer conductor 3, until the galvanometer 7 indicates no deflection, the position of the contact member 9 will be an indication of the drop in potential across the shunt 2 and, consequently, an indication of the current traversing the circuit 1. But, since the voltage is constant, the position of the contact member 9 is an indication of the power traversing the circuit 1. However, if the voltage across the circuit 1 changes, it is necessary to provide some means for so changing the drop in potential across the potentiometer conductor 3 as to compensate for changes in the voltage of the circuit. The indicator 12 is adapted to move the contact member 5 to such position that the current traversing the potentiometer conductor 3 varies inversely with respect to the voltage of the circuit 1. One way in which this result may be obtained is by the use of an instrument having coöperating stationary and movable windings or coils similar to various well known forms of wattmeters. In such instruments, the force of attraction or repulsion between the windings, by reason of the currents traversing the same, is, for any given position, proportional to the products of the currents traversing the windings. Thus, if the instrument is so arranged as to maintain an equal value of this force at all times, any increase or decrease in current in one winding necessitates a proportionate decrease or increase in the current in the other.

The stationary windings 10 are connected, through a constant-resistance resistor, to the circuit 1 in order that the current traversing the same may be directly proportional to the voltage of the circuit. The movable winding 4 is connected, through the contact member 5, to some point on the resistor 6 at which the potential is just sufficient to cause current to traverse the winding 4 that will produce a predetermined magnetic force between the windings 4 and 10. This force is maintained constant by changing the position of the contact member 5 to change the current in the winding 4 whenever there is a change of current in the winding 10.

When the movable contact member 9 is so moved that the potential drop across the shunt 2 is balanced with respect to a portion of the potentiometer conductor 3, the position of the contact member 9 will be an indication of the power traversing the circuit 1.

In Fig. 2 of the drawings, the circuit 1 is provided with a relatively low-resistance current shunt 2 and a potentiometer conductor 3 that is connected across the circuit. A contact-making galvanometer or meter 11 is connected, from the terminal 8 of the shunt 2, to a motor-operated contact member 9 that is adapted to be moved along the conductor 3. The conductor 3 is connected in series with the movable windings of the electro-responsive device or contact-making galvanometer 12. The meter 11 may be any form of contact-making device but is here shown, for convenience, as comprising two series-connected coils 19 and 20 mounted on a pivoted member 21. The coils coöperate with a permanent magnet 22 for the purpose of controlling the contact members 13. That is, the meter 11 is essentially a Kelvin balance having a constant magnetic field and which is controlled in the ordinary manner by the movable member 9. The meter 11 is provided with the contact members 13 for controlling a motor 14 that is adapted to actuate the contact member 9 to such position as to effect a balance between the drop in potential across the shunt 2 and the drop in potential across a portion of the potentiometer conductor 3.

The meter 12 comprises a Kelvin balance having stationary coils 10 and movable coils 4 which are mounted on a pivoted member 23 upon which contact members 15 are also mounted. The contact members 15 are actuated by the meter 12 for the purpose of controlling a motor 16 that is adapted to actuate the movable contact member 5 in such manner that the current traversing the conductor 3 will vary inversely as the voltage across the circuit 1. The meter 12 is controlled by the movable member 5, as is usual in Kelvin balances.

Since the position of the contact member 9 is maintained by the motor 14 in such position that it corresponds to the drop in potential across the shunt 2, and, consequently proportional to the current traversing the circuit 1, it is only necessary that this indication be corrected for changes in potential across the circuit 1, and this is obtained by the meter 12. which so controls the position of the contact member 5 that the drop in potential across the potentiometer conductor 3 is varied to compensate for changes in voltage in the circuit 1.

A marking device 17 is connected to the movable contact member 9 and is adapted to engage a record sheet 18 for the purpose of marking thereon a record of the power traversing the circuit 1. The meter is entirely automatic in its operation, and, since it is only necessary to compare the drops in potential, and relatively small torques are required for this purpose, a relatively low-resistance current shunt 2 may be effectively used.

Many modifications may be made within the spirit and scope of my invention as set forth in the appended claims.

I claim as my invention:

1. In an electric circuit, the combination with a current shunt, of a potentiometer conductor connected across the circuit, means for balancing the potential across the shunt with the potential across the potentiometer conductor, and means for causing the current traversing the potentiometer conductor to vary inversely as the voltage across the circuit.

2. In an electric circuit, the combination with a current shunt, of a potentiometer conductor connected across the circuit, means responsive to the potential drop across the shunt for balancing the potentiometer conductor, and means responsive to the voltage of the circuit for controlling the current traversing the potentiometer conductor.

3. In an electric circuit, the combination with a current shunt, of a potentiometer conductor connected across the circuit, a movable contact member for the potentiometer conductor, means responsive to the drop in potential across the shunt for actuating the contact member, and means for so controlling the drop in potential across the potentiometer conductor that the position of the contact member is an indication of power traversing the circuit.

4. In an electric circuit, the combination with a current shunt, of a potentiometer conductor connected across the circuit, a movable contact member for the potentiometer conductor, means responsive to the drop in potential across the shunt for so actuating the contact member that the drop in potential across a portion of the potentiometer conductor is equal to the drop in potential across the shunt, and means for causing the current traversing the potentiometer conductor to vary substantially inversely in proportion to the voltage across the circuit.

5. In an electric circuit, the combination with a current shunt, of a potentiometer conductor connected across the circuit, a movable contact member for the potentiometer conductor, means responsive to the drop in potential across the shunt for so actuating the contact member that the potential of the contact member is equal to the drop in potential across the shunt at all times, and means for so varying the drop in potential across the potentiometer conductor that the position of the contact member is an indication of the power traversing the circuit.

6. In an electric circuit, the combination with a current shunt, of a potentiometer conductor connected across the circuit, a movable contact member for the potentiometer conductor, means responsive to the drop in potential across the shunt for so actuating the contact member that the drop across a portion of the potentiometer conductor is equal to the drop across the shunt at all times, and means for so varying the drop in potential across the potentiometer conductor that the position of the movable contact member is an indication of the power traversing the circuit.

7. A direct-current wattmeter for operation in connection with a current shunt comprising a potentiometer conductor connected across the circuit, a contact member for the potentiometer conductor, means for so moving the contact member that the potential drop across a portion of the potentiometer conducor is equal to the drop across the shunt, and means for so varying the drop in potential across the potentiometer conductor that the position of the contact member is an indication of the power traversing the circuit.

8. A direct-current wattmeter for operation in connection with a current shunt comprising a potentiometer conductor connected across the circuit, means for causing the current traversing the potentiometer conductor to vary inversely as the potential across the circuit, and means for balancing the drop in potential across the shunt with the potentiometer conductor.

9. A direct-current wattmeter for operation in connection with a current shunt comprising a potentiometer conductor, means for causing the current traversing the same to vary inversely as the drop in potential across the circuit, and means for balancing the drop in potential across the shunt with the potentiometer conductor.

In testimony whereof, I have hereunto subscribed my name this 30th day of Jan., 1918.

HAROLD B. TAYLOR.